Dec. 11, 1951  F. P. BUNDY ET AL  2,578,398
APPARATUS FOR MEASURING GAS VELOCITY IN FLAMES
Filed Feb. 15, 1950
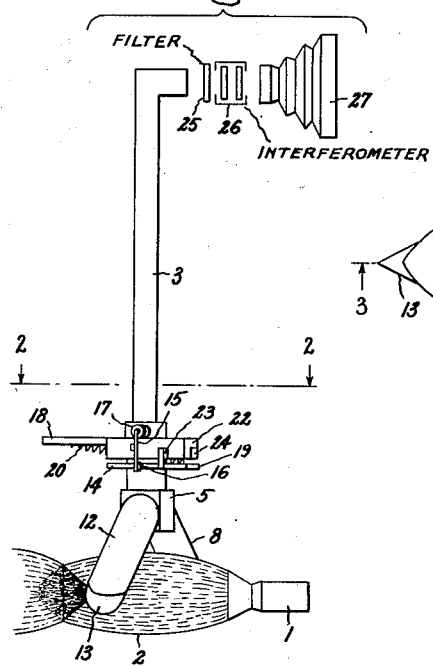
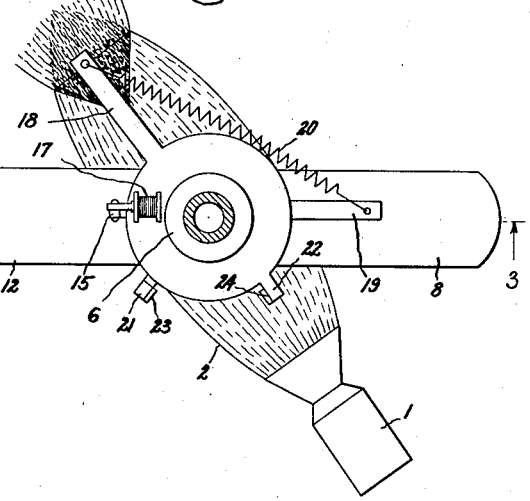
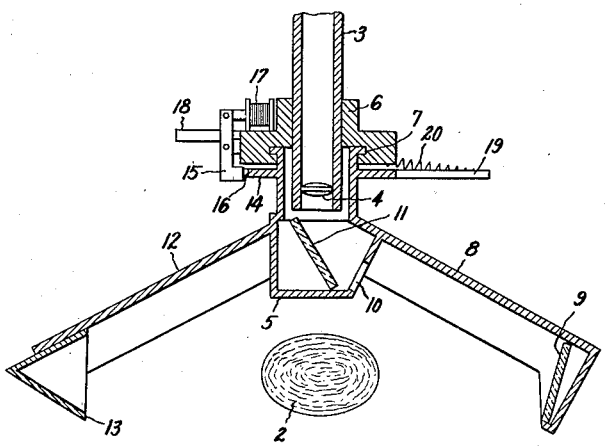
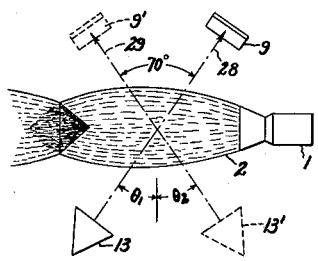
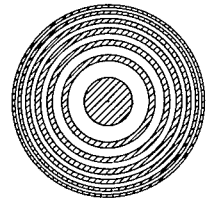
Inventors:
Francis P. Bundy,
Herbert M. Strong,
by Paul A. Frank
Their Attorney.

Patented Dec. 11, 1951

2,578,398

UNITED STATES PATENT OFFICE 2,578,398

APPARATUS FOR MEASURING GAS VELOCITY IN FLAMES

Francis P. Bundy, Alplaus, and Herbert M. Strong, Schenectady, N. Y., assignors to General Electric Company, a corporation of New York Application February 15, 1950, Serial No. 144,317

2 Claims. (Cl. 88—14)

This invention relates to improved apparatus for measuring velocity of gases in flames by use of the Doppler principle.

In the development of rocket motors and the like, it is desired to measure the velocity of gases in the exhaust flame of the motor. Since these gases may be at very high temperature, and may travel at supersonic speed, measurement by conventional methods is not practicable. For example, a probe inserted into the flame would be destroyed by the high temperature, and, in addition, such a probe would disturb the gas flow and thereby produce changes in the velocity to be measured.

An object of this invention is to provide improved means for measuring the velocity of gases in a flame, without inserting a probe into the flame. Other objects and advantages will appear as the description proceeds.

From the Doppler principle, it is known that there are slight differences in the observed wavelength of light emitted by a flame depending upon whether the light observed travels downstream or upstream with respect to the direction of gas velocity in the flame. However, these wavelength differences are quite small, and previous techniques have not permitted their measurement with sufficient accuracy to permit a practical determination of the gas velocity. The present invention provides defined technique and apparatus with which reasonably accurate measurements can be made of gas velocities in exhaust flames of rocket motors.

The features of this invention which are believed to be novel and patentable are pointed out in claims which form a part of the specification. For a better understanding of the invention, reference is made in the following description to the accompanying drawing, in which Fig. 1 is a schematic diagram of improved apparatus for measuring gas velocity in flames; Fig. 2 is a section along the line 2—2, Fig. 1; Fig. 3 is a section along line 3—3, Fig. 2; Fig. 4 is a schematic diagram showing two optical paths through the flame; and Fig. 5 is a schematic representation of an interference pattern formed by a Fabry-Perot interferometer used in the improved apparatus.

Referring now to Figs. 1, 2, and 3, the rocket motor 1 under test may be located in a test pit, not shown. The characteristic exhaust flame from motor 1 is represented at 2. The mean direction of gas velocity is along the axis of the flame away from motor 1. Observation of light emitted by the flame is preferably made through apparatus including a periscope 3, which transmits the light to a location outside the test pit. Periscope 3 may contain an optical system comprising a plurality of lenses 4 designed for maximum transmission of light through the periscope. An extension of the geometrical axis of periscope 3 extends through the region of flame 2 within which gas velocity is to be measured, perpendicular to the direction of gas velocity.

At the lower end of periscope 3 is a head 5 which is rotatable about the periscope axis. Head 5 is held in position by a member 6 which is firmly attached to the tube of periscope 3. A bearing connection 7 permits rotation of head 5 with respect to member 6.

Attached to head 5 and rotatable therewith is an extension arm 8, which may be semi-cylindrical in shape, as shown. A mirror 9 is attached to the outer end of arm 8. Mirror 9 is positioned so that light emitted by flame 2 perpendicular to the axis of periscope 3 is reflected by mirror 9 into an aperture 10 in the periscope head. A mirror 11 within the periscope head reflects this light up periscope tube 3.

A second extension arm 12 extends from the other side of head 5. At the outer end of arm 12 is a conical member 13, which preferably has a black inner surface. Member 13 is in optical alignment with mirror 9, so that the periscope "looks at" the reflection in mirror 9 of the black cone and the desired portion of flame 2. This arrangement substantially reduces the amount of background light reflected into the periscope. The two arms 8 and 12 are approximately equal in weight, so that the apparatus is nicely balanced.

A disc 14 is attached to the upper portion of head 5. A latch member 15 engages a slot 16 cut into the edge of disc 14. This holds head 5 in a first predetermined position. Latch member 15 is electrically operated by a solenoid 17, so that an electric signal applied to solenoid 17 draws latch member 15 out of engagement with slot 16, thus permitting head 5 to rotate.

Two outwardly extending arms 18 and 19 are attached to member 6 and to disc 14, respectively. A spring 20 is connected between the outer ends of arms 18 and 19, as shown. When latch 15 is disengaged, spring 20 rotates head 5. Stops 21 and 22, attached to disc 14 and to member 6, respectively, limit the amount of this rotation by coming into contact when the head has rotated 70° from its first position. This brings head 5 into the second of two predetermined positions. Damping pads 23 and 24 are preferably attached to stops 21 and 22, to prevent excessive jarring of head 5 when the stops make contact.

At the upper end of periscope 3 there preferably is a filter 25 which transmits in substantial amounts only that light which is near in wavelength to a resonance spectral line of an element present in flame 2. Preferably the sodium D line of the spectrum is used, for reasons hereinafter explained. The filtered light then passes through a Fabry-Perot interferometer 26, which produces an interference pattern. This interference pattern is photographed by camera 27.

Before the test run is started, head 5 is turned to its first position, in which latch 15 engages slot 16. In this position of the head, mirror 9 reflects into the periscope light emitted by the flame at an angle of 35° upstream from a plane normal to the mean direction of gas velocity. Referring to Fig. 4, this position of the head is indicated by mirror 9 and cone 13, between which there is an optical path represented by broken line 28. In the first position of the head, an interference pattern is obtained and photographed with the apparatus previously described.

An electric signal is then applied to the solenoid 17, which disengages latch 15. Spring 20 rotates head 5 by 70°, so that the mirror and the cone assume the positions shown in Fig. 4 at 9' and 13', respectively. The optical path, which is represented by broken line 29, now extends at an angle of 35° downstream from a plane normal to the mean direction of gas velocity.

The change from the first position to the second position of head 5 may be made very rapidly, in about one second or less. Each interference pattern requires an exposure of about six seconds for a good photograph. Therefore, the total time required for taking the two photographs is no more than 13 seconds. This speed of operation permits taking both photographs during a single test run of a rocket motor. An important advantage of this arrangement is that the same optical elements are used for both photographs, which minimizes difficulties from slight imperfections or maladjustment in the optical system.

The two photographs are made from light emitted at different angles with respect to the direction of gas velocity; i. e., one photograph is made of light emitted in an upstream direction, while the other is made of light emitted in a downstream direction. Therefore, according to the Doppler principle, there is a slight difference in the wavelength of light used in making the two photographs, which is related to gas velocity in the flame by the formula $$(1) \quad v = \frac{c(\delta\lambda)}{2(\lambda)} \operatorname{cosec} \frac{\theta}{2}$$

In this equation, $c$ represents the velocity of light;

$$\frac{\delta\lambda}{\lambda}$$

represents the fractional change in wavelength; and $\theta$ represents the angle between the two positions of head 5, in this case 70°. $\theta$ is equal to the sum of the upstream angle $\theta_1$ and the downstream angle $\theta_2$, shown in the drawing. Equation 1 is correct only for equal upstream and downstream angles of the respective optical paths from a plane normal to the direction of gas velocity. For unequal angles, $\theta_1$ and $\theta_2$, the equation is $$(1') \quad v = \frac{(\delta\lambda)}{(\lambda)} \frac{C}{\sin\theta_1 + \sin\theta_2}$$

The value 70° for the swing angle $\theta$ has been found to be most satisfactory. To obtain the largest wavelength difference for a given gas velocity, $\theta$ should be as near 180° as is practicable. However, as the value of $\theta$ is increased, the optical paths extend a greater distance through the layer of entrained gas which surrounds the flame and which may absorb substantial amounts of the emitted light. The value of 70° for $\theta$ has been found to be a good compromise.

The interference pattern formed by the Fabry-Perot interferometer comprises a series of concentric annular interference fringes, as illustrated in Fig. 5. A detailed description of the Fabry-Perot interferometer may be found in the book by Tolansky, "High Resolution Spectroscopy," Methuen: London, 1945. In Fig. 5, the shaded portions represent the light interference fringes, or the dark portions of a photographic negative made by camera 27, Fig. 1. Each of the fringes represents a small portion of the spectrum containing the D line emitted by sodium. Actually, the D line is a pair of closely spaced lines, but these can be made to coincide, and appear in the interference pattern as a single line, by making the spacing between the interferometer plates a multiple 0.02906 centimeter. Preferably the seventh multiple, 0.2034 centimeter, is used as the spacing between interferometer plates.

The two photographs made by camera 27 at respective positions of head 5 are alike except for a small difference in the radii of corresponding interference fringes. This difference in fringe radii is due to the small difference in observed wavelength of the D line, which depends upon whether the light observed travels upstream or downstream with respect to the direction of gas velocity. As hereinbefore explained, the velocity of gases in the flame can be computed from this wavelength difference. The wavelength difference is determined by measuring the difference in radii of corresponding interference fringes in the two photographs. This wavelength difference is computed from the following equation:

$$(2) \quad \delta\lambda = \frac{\lambda^2 m}{kd}$$

In this equation, $\delta\lambda$ represents the wavelength difference in Ångstrom units; $\lambda$ represents the mean wavelength of the D line in Ångstrom units, $d$ represents the space between interferometer plates in centimeters; and $k$ and $m$ are values determined from measurements of the interference pattern photographs made in the manner hereinafter described.

To determine the value of $k$, the fringes in one of the interference pattern phoographs are consecutively numbered outward from the center, the center fringe being No. 1. Taking any two fringes, and designating their fringe numbers by the letters $p$ and $q$, and designating their measured radii by the letters $r_p$ and $r_q$, the value of $k$ is given by the equation $$(3) \quad k = \frac{4(r_q^2 - r_p^2)}{q - p}$$

Theoretically, the same value of $k$ should be obtained for any set of two fringes selected. Due to slight imperfections in the optical system, there may be slight errors in the value so computed, which can be averaged out by computing $k$ for several different pairs of fringes, and averaging the result.

The value of $m$ is computed from measurements of the radii of corresponding fringes in the two patterns. These measurements may be made with a microscope micrometer, or by making densitometer traces across the two photographs and comparing the resulting curves, or by other suitable means. Assume that the fourth fringe in each pattern is selected arbitrarily. Let $r_1$ represent the radius of the fourth fringe in one photograph, and $r_2$ represent the radius of the fourth fringe in the other photograph. The value of $m$ is given by the equation (4) $\qquad m = 2(r_1 + r_2)(r_1 - r_2)$ Here, again, it is desirable that several sets of fringes be measured, and an average value of $m$ taken, to average out errors due to imperfections in the optical system.

Substituting the values for $k$ and $m$, and solving Equation 2 provides the wavelength difference $\delta\lambda$. Substituting this value and solving Equation 1 provides the velocity of gases within the region of the flame where the two optical paths cross.

Although any resonance type spectral line may be employed in making the measurements hereinbefore described, the D line of sodium is especially suitable because of its prominence, and because traces of sodium are naturally present in most rocket fuels. If not present, traces of sodium can easily be added to the fuel. It is desirable that the amount of sodium present be just enough to provide sufficient illumination for taking the photographs. Too much sodium is undesirable, because it broadens the D line and thereby makes determination of the small wavelength differences more difficult. The sodium atoms have about the same mass as the average molecules which make up the flame, and as the sodium is always in a vaporized state in the flame, it is certain that the sodium atoms serve as light sources which move along with the flame gases without slippage. This is not the case for particles which are large in comparison to the atoms, such as smoke particles. Any flame which is hotter than about 1600° K can excite the sodium D line radiation with sufficient intensity for photography or visual observation.

Having described the principle of this invention and the best mode in which we have contemplated applying that principle, we wish it to be understood that the examples described are illustrative only, and that other means can be employed without departing from the true scope of the invention.

What we claim as new and desire to secure by Letters Patent of the United States is:

1. In apparatus for measuring gas velocity in flames, the combination of a periscope positioned so that an extension of its axis passes through the region in which gas velocity is to be measured and is perpendicular to the mean direction of gas velocity, said periscope having a head which is rotatable about the periscope axis, an electrically operated latch for holding said head in a first position, spring means for rotating said head to a second position when said latch is released, an extension arm attached to said head and rotatable therewith, and a mirror attached to the outer end of said extension arm and positioned to reflect into said periscope light emitted by the flame perpendicular to the axis of said periscope, so that light emitted at different angles to the direction of gas velocity is reflected into the periscope at the respective positions of said head.

2. Apparatus for measuring gas velocity in flames, comprising a periscope positioned so that an extension of its axis passes through the region in which gas velocity is to be measured and is perpendicular to the direction of gas velocity, an extension arm, a mirror attached to the outer end of said extension arm and positioned to reflect into said periscope light emitted by the flame perpendicular to the axis of said periscope, means to rotate said extension arm and said mirror about the axis of said periscope to reflect into the periscope light emitted by the flame at selectively different angles to the direction of gas velocity, a filter which transmits in substantial amounts only that light which is near in wavelength to a resonance spectral line of an element present in the flame, said filter being positioned in optical alignment with said periscope, a Fabry-Perot interferometer positioned to form interference patterns from light transmitted by said periscope and said filter, and a camera positioned to photograph such interference patterns.

FRANCIS P. BUNDY.
HERBERT M. STRONG.

REFERENCES CITED

The following references are of record in the file of this patent:

UNITED STATES PATENTS

| Number | Name | Date |
|---|---|---|
| 826,155 | Dudley | July 17, 1906 |
| 2,288,143 | Sheppard | June 30, 1942 |
| 2,291,776 | Wager | Aug. 4, 1942 |

OTHER REFERENCES

Hardy & Perrin, Principles of Optics, McGraw-Hill Book Co., New York 1932 (1st edition), page 12 cited.

Wood, Physical Optics, MacMillan Co., New York, 1936 (3rd edition), pages 24 to 28 inclusive cited.

Jenkins and White, Fundamentals of Physical Optics, McGraw-Hill Book Co., New York, 1937, pages 18, 19 cited.

"Measurement of Flame Velocity by the Doppler Principle Using Interferometer," May 23, 1940, Archive 48/2 (In German).

"German Measurement of Rocket Nozzle Gas Velocity," Halstead Exploitation Centre Translation No. BIOS/Gp. 2/HEC .551B-2, original author: Hedfield at Trauen, January 19, 1944.